US008329819B2

(12) United States Patent
Huang et al.

(10) Patent No.: US 8,329,819 B2
(45) **Date of Patent: *Dec. 11, 2012**

(54) ORGANIC/INORGANIC COMPOSITE AND FIRE-RESISTANT PLATE UTILIZING THE SAME

(75) Inventors: Yung-Hsing Huang, Taipei (TW); Chih-Ming Hu, Kaohsiung (TW); Che I. Kao, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 412 days.

This patent is subject to a terminal disclaimer.

(21) Appl. No.: 11/642,627

(22) Filed: Dec. 21, 2006

(65) Prior Publication Data

US 2007/0179235 A1 Aug. 2, 2007

Related U.S. Application Data

(63) Continuation-in-part of application No. 11/410,913, filed on Apr. 26, 2006.

(30) Foreign Application Priority Data

Dec. 26, 2005 (TW) ................................ 94146503 A

(51) Int. Cl.
*C08G 18/22* (2006.01)
*C08G 18/10* (2006.01)
*C08G 18/28* (2006.01)

(52) U.S. Cl. ........ 525/123; 525/369; 524/436; 524/437; 428/40.2; 428/422.8

(58) Field of Classification Search .................. 524/436, 524/437; 525/123, 369; 428/40.2, 422.8
See application file for complete search history.

(56) References Cited

U.S. PATENT DOCUMENTS

| | | | | | |
|---|---|---|---|---|---|
| 3,714,047 | A | * | 1/1973 | Marion et al. | 252/62 |
| 4,150,207 | A | * | 4/1979 | Cenker et al. | 521/174 |
| 4,376,840 | A | * | 3/1983 | Moriwaki et al. | 524/779 |
| 4,748,195 | A | | 5/1988 | Hackl et al. | |
| 4,876,291 | A | * | 10/1989 | Dallavia et al. | 521/124 |
| 5,218,027 | A | | 6/1993 | Smith et al. | |
| 5,418,272 | A | * | 5/1995 | Kawabata et al. | 524/436 |

(Continued)

FOREIGN PATENT DOCUMENTS

CN 1262698 A 8/2000

(Continued)

OTHER PUBLICATIONS

JP 09059509 A, Mar. 1997, machine translation.*

(Continued)

*Primary Examiner* — Satya Sastri
(74) *Attorney, Agent, or Firm* — Birch, Stewart, Kolasch & Birch, LLP

(57) ABSTRACT

The invention discloses a fire-resistant composite comprising inorganic particles well dispersed in a polymer, oligomer or copolymer having reactive functional groups. The inorganic particles also contain reactive functional groups, originally or after surface modification, that can react with the corresponding reactive functional groups of the organic component to form organic/inorganic composite materials. When the composite material is burned or exposed to fire, the organic component forms a char layer and the inorganic particles radiate absorbed heat. The inorganic particles also strengthen the mechanical properties of the structure through the reaction between inorganic and organic materials. The invention also discloses a fire-resistant plate containing the organic/inorganic component.

19 Claims, 6 Drawing Sheets

U.S. PATENT DOCUMENTS

| | | | |
|---|---|---|---|
| 5,670,748 A | 9/1997 | Gingue et al. | |
| 5,723,515 A | 3/1998 | Gottfried | |
| 5,853,809 A * | 12/1998 | Campbell et al. | 427/407.1 |
| 6,020,419 A * | 2/2000 | Bock et al. | 524/590 |
| 6,262,161 B1 | 7/2001 | Betso et al. | |
| 6,599,631 B2 * | 7/2003 | Kambe et al. | 428/447 |
| 6,646,205 B2 * | 11/2003 | Hase et al. | 174/110 R |
| 6,815,489 B1 | 11/2004 | Fischer et al. | |
| 7,053,145 B1 | 5/2006 | Tasaka et al. | |
| 2004/0054035 A1 | 3/2004 | Hallissy et al. | |
| 2006/0014880 A1 * | 1/2006 | Zhong et al. | 524/451 |
| 2006/0036006 A1 | 2/2006 | Heschke et al. | |
| 2007/0149675 A1 * | 6/2007 | Huang et al. | 524/425 |
| 2007/0149676 A1 * | 6/2007 | Hu et al. | 524/425 |
| 2007/0149677 A1 * | 6/2007 | Huang et al. | 524/425 |
| 2007/0179235 A1 | 8/2007 | Huang et al. | |

FOREIGN PATENT DOCUMENTS

| | | | | |
|---|---|---|---|---|
| CN | 1341141 | A | | 3/2002 |
| DE | 2854898 | A | | 12/1978 |
| DE | 2854898 | A | * | 6/1980 |
| DE | 237758 | A3 | | 7/1986 |
| DE | 19941181 | A1 | | 5/2000 |
| EP | 1 100 093 | A3 | | 5/2001 |
| EP | 1 215 238 | A1 | | 6/2002 |
| EP | 1 215 685 | A1 | | 6/2002 |
| EP | 1384752 | A1 | | 1/2004 |
| EP | 1457523 | A1 | | 9/2004 |
| JP | 47-44351 | | | 11/1972 |
| JP | 51022799 | A | * | 2/1976 |
| JP | 57-92037 | A | | 6/1982 |
| JP | 59-42779 | A | | 3/1984 |
| JP | 61272222 | A | | 12/1986 |
| JP | 62-201934 | A | | 9/1987 |
| JP | 2-210717 | A | | 8/1990 |
| JP | 02202907 | A | * | 8/1990 |
| JP | 4-55454 | A | | 2/1992 |
| JP | 04202587 | A | * | 7/1992 |
| JP | 5-239281 | A | | 9/1993 |
| JP | 08113682 | A | * | 5/1996 |
| JP | 09059509 | A | * | 3/1997 |
| JP | 9-204824 | A | | 8/1997 |
| JP | 10029278 | A | * | 2/1998 |
| JP | 10-120948 | A | | 5/1998 |
| JP | 10147707 | A | * | 6/1998 |
| JP | 10-245456 | A | | 9/1998 |
| JP | 11080538 | A | * | 3/1999 |
| JP | 11-306873 | A | | 11/1999 |
| JP | 11-310720 | A | | 11/1999 |
| JP | 2001-2840 | A | | 1/2001 |
| JP | 2002-179857 | A | | 6/2002 |
| JP | 2002-324442 | A | | 11/2002 |
| JP | 2003-96306 | A | | 4/2003 |
| JP | 2004254407 | A | * | 9/2004 |
| JP | 2005-60675 | A | | 3/2005 |
| JP | 2005-162931 | A | | 6/2005 |
| JP | 2005-213480 | A | | 8/2005 |
| JP | 2005-232264 | A | | 9/2005 |
| TW | 442549 | | | 9/1987 |
| TW | 397885 | | | 7/1988 |
| TW | 499469 | | | 2/1989 |
| TW | 583078 | | | 6/1990 |
| TW | 419514 | | | 1/2001 |
| TW | 200415235 | A | | 8/2004 |
| TW | 263628 | B1 | | 10/2006 |
| WO | WO-99/27015 | A1 | | 6/1999 |
| WO | WO 2004/035711 | A1 | | 9/2004 |

OTHER PUBLICATIONS

JP 04202587 A, Jul. 1992, Takahashi et al., Derwent Ab.*
JP11080538A, Machine translation, Mar. 1999, Kumasaka.*
JP 2004254407 A, Sep. 2004, Englsih Translation.*
JP 02202907 A, Aug. 1990, English Translation.*
JP 10147707 A, Jun. 1998, Machine Translation.*
DE 2854898 A, Jun. 1980, English Translation.*
JP 51022799 A, Feb. 1976, English Translation.*
JP2004254407A, Sep. 2004, Englsih Translation.*
Japanese Office Action, Appl. No. 2006-348595, Aug. 30, 2011, pp. 1-2 (w/ English translation).
Chinese Office Action, Appl. No. 200610171789.2, Oct. 29, 2010, pp. 1-4.
German Examination Report, Appl. No. 102006062148.4-43; Sep. 28, 2010, pp. 1-4 (w/ full English translation).
CN Office Action, Appl. No. 200610171789.2, Feb. 10, 2011, pp. 1-5.
CN Office Action, Appl. No. 200610171790.5, Mar. 3, 2011, pp. 1-3.
Finnish Office Action dated Jan. 3, 2011 for Finnish Application No. 20070484.
Japanese Office Action dated Apr. 12, 2011 for Japanese Application No. 2006-348596.
Taiwanese Notice of Allowance dated Apr. 27, 2011 for Taiwanese Application No. 095148155.
German Office Action issued Nov. 4, 2010, in German Application No. 10 2006 062 147.6-34.
German Office Action issued Sep. 28, 2010, in German Application No. 10 2006 062 146.8-43.
Japanese Office Action issued Novmber 30, 2010, in Japanese Application No. 348595/2006, with partial translation.
Office Action dated Jan. 27, 2011 for Taiwanese Application No. 095148155.
USPTO Office Action dated Nov. 7, 2011 for U.S. Appl. No. 11/642,646.

* cited by examiner

ORGANIC/INORGANIC COMPOSITE AND FIRE-RESISTANT PLATE UTILIZING THE SAME

CROSS-REFERENCE TO RELATED APPLICATIONS

This application is a Continuation-In-Part of application Ser. No. 11/410,913, filed on Apr. 26, 2006, which claims priority to Taiwan Patent Application no. 94146503, filed on Dec. 26, 2005.

BACKGROUND OF THE INVENTION

1. Field of the Invention

The invention relates to organic/inorganic composites showing excellent fire resistant performance and a fire-resistant plate containing the organic/inorganic composite.

2. Description of the Related Art

Fire resistant or fire retardant materials can be used as architectural or decorative materials. Architecture materials disclosed in Taiwan Patent Nos. 583,078 and 397,885 primarily comprise a stacked layer, serving as a fire resistant layer of nonflammable inorganic materials such as pearlite (or perlite), $MgCl_2$, MgO, $CaCO_3$ or cement. In addition, a stiff fire resistant laminate can be obtained from flexible substrates of fibers or nonwovens blended with flame retardants, foaming agents and 50~80 inorganic materials by weight.

Fire resistant coatings, serving as decorative materials, disclosed in Taiwan Patent Nos. 442,549, 499,469 and 419,514 comprise a combination of foaming and intumescent agents, carbonization agents, flame retardants, and adhesives which foam and intumesce when exposed to fire. U.S. Pat. No. 5,723,515 discloses a fire-retardant coating material comprising a fluid intumescent base material having a foaming agent, a blowing agent, a charring agent, a binding agent, a solvent, and a pigment, increasing resistance to cracking and shrinking. A compound disclosed in U.S. Pat. No. 5,218,027 is manufactured from a composition of a copolymer or terpolymer, a low modulus polymer, and a synthetic hydrocarbon elastomer. The fire retardant additive comprises a group I, group II or group III metal hydroxide with the proviso that at least 1% by weight of the composition is in the form of an organopolysiloxane. U.S. Pat. No. 6,262,161 relates to filled interpolymer compositions of ethylene and/or alpha-olefin/vinyl or vinylidene monomers, showing improved performance under exposure to flame or ignition sources, and articles fabricated therefrom. The articles can be in the form of a film, sheet, multilayered structure, floor, wall, or ceiling covering, foams, fibers, electrical devices, or wire and cable assemblies. Conventional flame retardant polymer compositions are obtained by physical bending of organic polymer and inorganic flame retardant, wherein coupling agents or surfactants are typically incorporated to improve the dispersity of inorganic flame retardant. However, because the organic polymer does not react with inorganic component to form a well-structured composite by the formation of chemical bonds, the conventional flame retardant compositions easily melt, ignite, or produce flaming drops under exposure to flame or ignition sources.

Specifically, as shown in FIGS. 1a~1b, the heated area of a the conventional fire resistant material can be carbonized rapidly and expand 8~10 times in volume than the original due to the foaming, intumescent, and carbonization agents contained. However, as shown in FIGS. 1c-1d, after long term heating, the intumescent carbonization layer (or the heated part) cracks slightly and peels, such that flame and heat can directly transfer to the interior materials and fire resistance is overcome. Accordingly, an improved fire resistant material is desirable.

BRIEF SUMMARY OF THE INVENTION

In view of the problems in conventional technology, the invention utilizes a fire resistant composite material comprising various inorganic particles fully dispersed in a polymer, copolymer, or oligomer having reactive functional groups. The inorganic particles also contain reactive functional groups, originally or after surface modification, that can react with the corresponding reactive functional groups of the organic component to form organic/inorganic composite materials. Through the reaction between organic and inorganic components, the mechanical and fire resistant properties of the organic polymer are strengthened and enhanced. As a well-structured composite is provided by the formation of chemical bonds, the char layer formed on the surface is firm and can maintain its structural integrity without peeling or cracking, effectively preventing direct heat transfer to the interior.

The organic/inorganic composite of the invention comprises a polymer, copolymer, or oligomer having a first reactive functional group; and inorganic particles having a second reactive functional group; wherein the inorganic particles are chemically bonded to the polymer, copolymer, or oligomer via a reaction between the first and second reactive functional groups.

The invention further provides a fire-resistant plate comprising the disclosed composite.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1A:
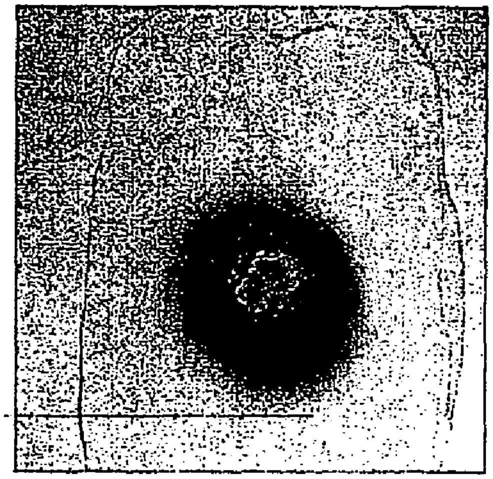
FIGS. 1a-1d show conventional intumescent fire resistant materials subjected to a flame test.
Figure 1B:
Figure 1C:
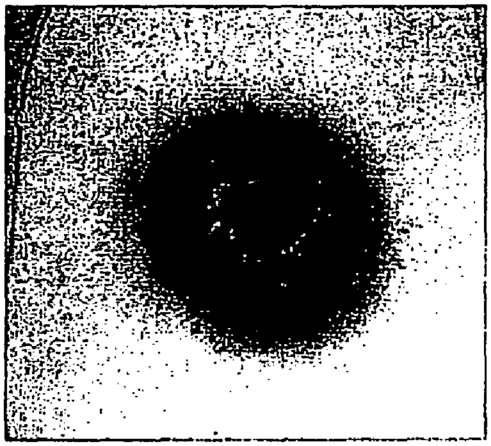
Figure 1D:
Figure 2:
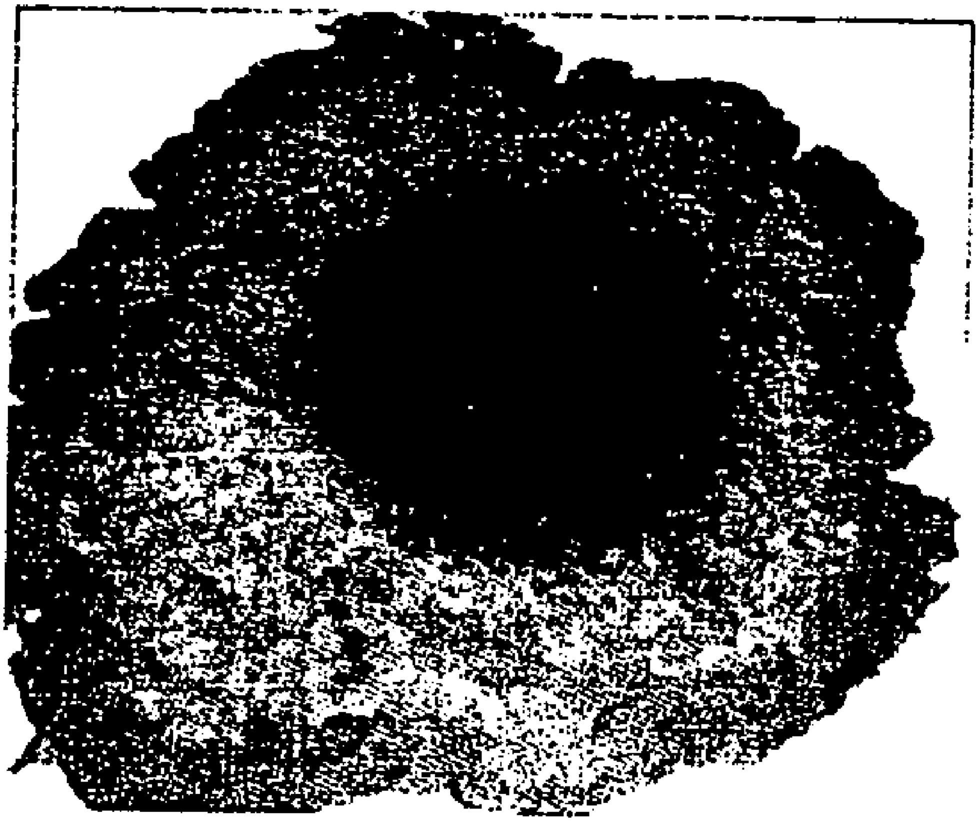
FIG. 2 shows an organic polymer/inorganic particles composite material of the invention subjected to a flame test.

The following description is of the best-contemplated mode of carrying out the invention. This description is made for the purpose of illustrating the general principles of the invention and should not be taken in a limiting sense. The scope of the invention is best determined by reference to the appended claims.

When the organic/inorganic composite material is burned or exposed to fire, the organic component forms a char layer and the inorganic particles radiate absorbed heat. The inorganic particles also strengthen the mechanical properties of the structure through the reaction between inorganic and organic materials, so that char layer formed on the surface is firm and can maintain its structural integrity without peeling or cracking, effectively preventing direct heat transfer to the interior. The fire resistant material is not only flame retardant but also protective of interior materials. As a result, the duration of fire resistant ability is tremendously improved.

In the invention, inorganic particles having reactive functional groups, originally or after surface modification, are well dispersed in and reacted with an organic component such as polymer, monomer, oligomer, prepolymer, or copolymer to enhance the fire resistant and mechanical properties. In general, the organic/inorganic composite may comprise 10-90% by weight of the organic component, and 90-10% by weight of the inorganic particle. Preferably, the organic/inorganic composite comprises 30-70% by weight of the organic component, and 70-30% by weight of the inorganic particle, and more preferably 40-60% by weight of the organic component, and 60-40% by weight of the inorganic particle.

The organic component in the resulting composite may comprise polymer, copolymer or oligomer. For the purposes of the invention, the term "polymer" or "copolymer" refers to compounds having number average molecular weights in the range from 1500 to over 1,00,000 Daltons, while "oligomer" refers to compounds having number average molecular weights in the range of from 200 to 1499 Daltons.

In the organic/inorganic composite, the organic component and the inorganic particles are chemically bonded via reactions of corresponding reactive functional groups. The reactive functional groups of the organic component and inorganic particles include, but are not limited to, —OH, —COOH, —NCO, $—NH_3$, $—NH_2$, —NH, and epoxy groups. For example, an organic component having —COOH or —NCO groups (e.g., organic acid or reactive polyurethane) can be employed to react with inorganic particles having —OH groups (e.g., metal hydroxide). In addition, an organic component having epoxy groups can be employed to react with inorganic particles having $—NH_2$ groups. Alternatively, an organic component having —OH groups (e.g., polyvinyl alcohol) may react with inorganic particles having —COOH or —NCO groups, and an organic component having $—NH_2$ groups may react with inorganic particles having epoxy groups.

Organic components suitable for use herein include any monomer, oligomer, monopolymer, copolymer, or prepolymer that contains the above-mentioned reactive functional groups. The reactive functional groups may reside in backbone or side chain of the polymer. Preferred organic components include polyoragnic acid, polyurethane, epoxy, polyolefin, and polyamine. The polyorganic acid includes momopolymers or copolymers that contain carboxylic or sulfonic acids such as poly(ethylene-co-acrylic acid and poly (acrylic acid-co-maleic acid). Illustrative examples of epoxy include bis(3,4-epoxy-6-methylcyclohexylmethyl) adipate, vinylcyclohexene dioxide, diglycidyl tetrahydrophthalate, diglycidyl hexahydrophthalate, bis(2,3-epoxycyclopentyl) ether resin, glycidyl ethers of polyphenol epoxy resin. Polyamines suitable for use include polyamine and polyimide. Illustrative examples of polyamine include nylon 6 ($(NH(CH_2)_5CO)_n$), nylon 66 ($(NH(CH_2)_6—NH—CO(CH_2)_4CO)_n$), and nylon 12 ($(NH(CH_2)_{11}CO)_n$). The polyimide includes diamine such as 4,4-oxydianiline, 1,4-bis(4-aminophenoxy)benzene, or 2,2-bis[4-(4-aminophenoxy)phenyl] propane; and also includes polyimide synthesized by the diamine and dianhydride such as oxydiphthalic anhydride, pyromellitic dianhydride, or benzophenone tetracarboxylic dianhydride. Polyolefins suitable for use include copolymers of an olefin monomer and a monomer having the above reactive functional groups. It should be noted that the organic component also includes monomer, oligomer, copolymer and prepolymer of the above illustrative polymers. In addition, the organic components may be used alone or in admixture of two or more.

Inorganic particles suitable for use herein are those having corresponding functional groups, originally or after surface modification, that can react with the functional groups of the organic component. Preferred inorganic particles include hydroxide, nitride, oxide, carbide, metal salt, and inorganic layered material. Hydroxides include metal hydroxide such as $Al(OH)_3$ or $Mg(OH)_2$. Nitrides include, for example, BN and $Si_3N_4$. Carbides include, for example, SiC. Metal salts include, for example, $CaCO_3$. Inorganic layered materials include, for example, clay, talc, and layered double hydroxide (LDH), wherein the clay can be smectite clay, vermiculite, halloysite, sericite, saponite, montmorillonite, beidellite, nontronite, mica, or hectorite. The inorganic particles can also be used in admixture of two or more. For example, a clay having reactive functional groups can be used in combination with metal hydroxide. Suitable inorganic particles include micro-sized particles and nano-sized particles. Nano-sized particles having diameters between 1 and 100 nm are particularly preferred because the smaller particle size the greater the surface area per unit weight.

Figure 3:
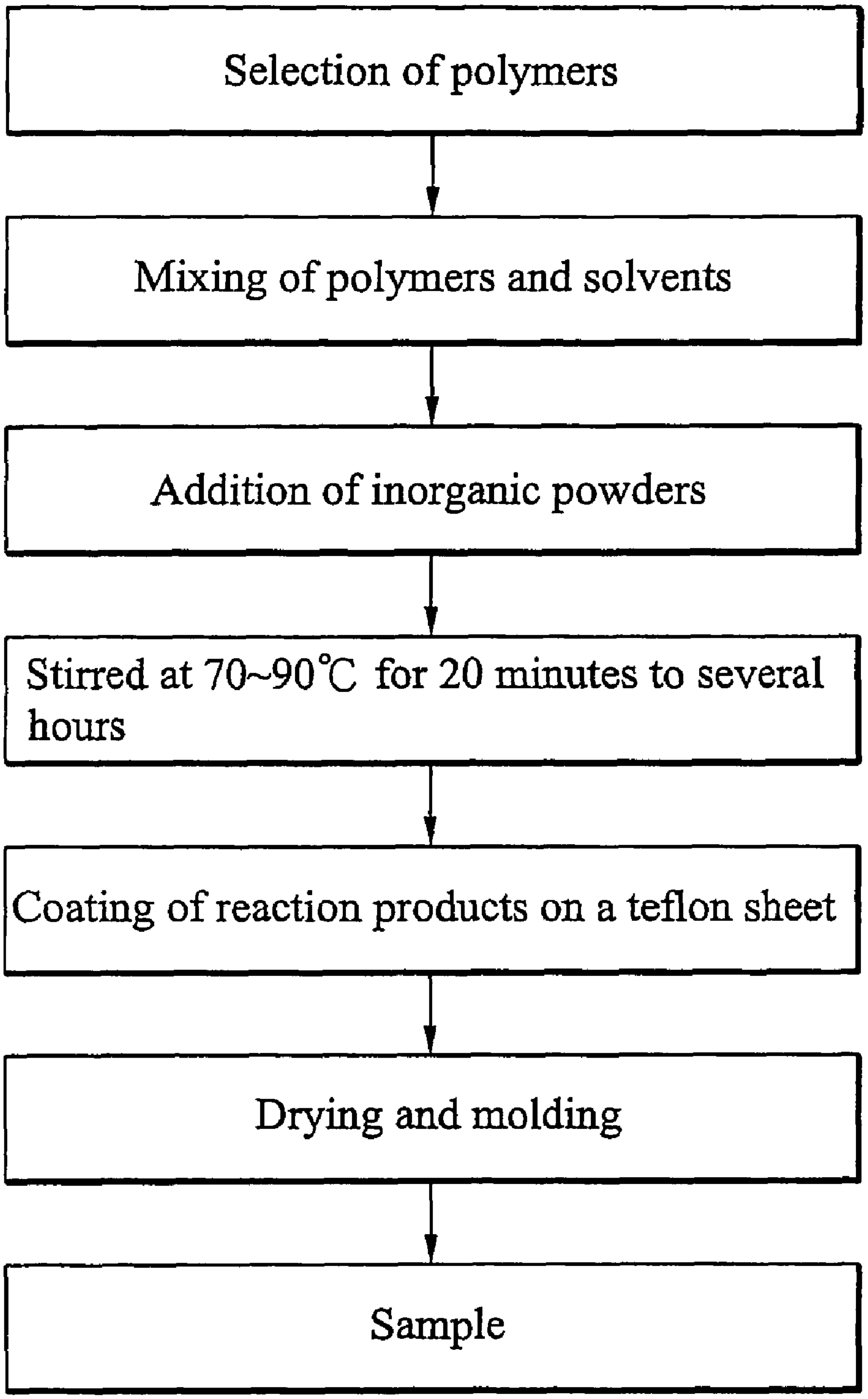
FIG. 3 is a flowchart demonstrating the synthesis processes of the organic polymer/inorganic particles composite material.

The organic component and the inorganic particles can be directly mixed for reaction to form covalent bonds or ionic bonds, or the reaction can be carried out in various solvates (e.g., water, ethanol, or methyl ethyl ketone). The reaction temperature is generally from room temperature to about 150° C. and the reaction time may vary from 10 minutes to few days, depending on the starting materials used. FIG. 3 is a flowchart demonstrating the processes of the organic polymer/inorganic particle composite material. As shown in FIG. 3, the organic polymer containing reactive functional groups (such as R—COOH, where R represents carbon chains) on main chains is mixed with solvents (such as water, alcohol, or MEK). Subsequently, inorganic particles with corresponding reactive functional groups (such as M-OH, where M represents metal) are added to the polymer solution, and the mixture is stirred at 70-90° C. for 20 minutes to several hours till the reaction has completed. The slurry of $R—COO^-M^+$ is produced by means of the reaction between R—COOH of the polymer and M-OH of the inorganic particles, where R represents carbon chains and M represents metal. A composite sample layer can be obtained by coating the slurry on a teflon sheet followed by drying and molding the slurry layer at elevated temperature. The sample layer can be rigid or flexible depending on the organic/inorganic system of the composite.

The organic/inorganic composite of the invention can be molded into fire-resistant plates, flakes, or films by various methods. Note that while the term "fire-resistant plate" is used throughout the specification for the sake of simplicity, it will be understood to include films having a thickness of less than 0.5 mm, flakes having a thickness between 0.5 and 2 mm, or plates having a thickness exceeding 2 mm. Suitable molding methods include conventional compression molding, injection molding, extrusion molding, calender molding, and the like. The sample can be oven-dried or kept at room temperature until molding.

The fire-resistant plate of the invention can be mounted onto the surfaces of flammable or inflammable articles by adhesives or mechanical tools (e.g., screws, nails, or clamps) to improve the fire resistance. Furthermore, the fire-resistant plate can be fabricated into a multilayer structure with or without other flammable or inflammable plates. When the organic/inorganic composite of the invention is burned or exposed to fire, the polymer forms a char layer and the inorganic particles radiate absorbed heat. The inorganic particles also strengthen the mechanical properties of the structure through the reaction between inorganic and organic materials, so that the formed char layer is firm and can maintain its structural integrity without peeling or cracking, effectively preventing direct heat transfer to the interior. The fire-resistant plate is not only flame retardant but also protective of interior materials. As a result, fire resistance is extended significantly. In preferred embodiments, the fire-resistant plate is capable of withstanding flame temperatures between 1000 and 1200° C. for more than 3 minutes. Because the organic component and the inorganic particles are chemically bonded (compared to the conventional physical bending products), the fire-resistant composite of the invention does not melt, ignite or produce flaming drops under exposure to flame or ignition sources.

The fire-resistant plate of the invention has a wide range of application. For example, it is suitable in fire-resistant spacer plates, or fire-resistant wallpaper. Further, it can be fabricated into flexible fire-resistant plates. Accordingly, those of ordinary skill in the art may incorporate various additives depending on the specific application. For example, flame retardant such as melamine phosphates, red phosphorus, and phosphorus-based flame retardant may be present to improve the flame retardancy. Silane (such as TEOS or TEVS) or siloxane may be present to strengthen structural integrity and facilitate curing. Glass sand and glass fiber may be present to improve the heat resistance and strengthen structural integrity. The amount of these additives is typically between 0.1 and 20 parts by weight, based on 100 parts by weight of the organic/inorganic composite.

EXAMPLES OF FIRE-RESISTANT COMPOSITES

Example 1

Poly(ethylene-co-acrylic acid) containing R—COOH was dissolved or dispersed in water. Subsequently, inorganic particles $Al(OH)_3$ with reactive functional groups M-OH were added to the polymer solution, and the mixture was stirred at 70~90° C. for 20 minutes. 1 mm-thick mixture slurry was coated on a teflon sheet, and then placed in an oven, dried at 60° C. for 60 minutes, 80° C. for 60 minutes, 100° C. for 60 minutes, 120° C. for 30 minutes, 140° C. for 30 minutes, 160° C. for 30 minutes, 180° C. for 30 minutes, and finally, molded at 200° C. for 240 minutes.

Figure 4:
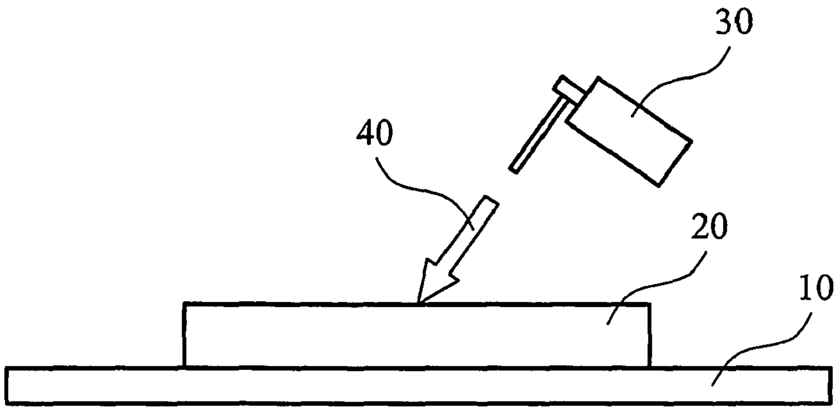
FIG. 4 is a schematic figure demonstrating the flame test for a sample of the organic polymer/inorganic particles composite material.

As shown in FIG. 4, the sample layer 20 was removed from the teflon sheet (not shown), and placed on a piece of A4 size paper 10. A flame test was conducted on the surface of the sample layer 20 by butane gas torch 30 with flame temperature of 1000-1200° C. (flame 40) for 30 seconds to 3 minutes. The result of the burning phenomenon of the piece of A4 size paper is summarized in Table 1. No scorching was observed on the piece of A4 size paper after heating for 30, 60 and 120 seconds while it became slightly scorched after heating for 180 seconds.

According to this embodiment, the duration of fire resistance was more than 3 minutes due to the strengthened sample layer, i.e. R—COOH of poly(ethylene-co-acrylic acid) reacted with M-OH of $Al(OH)_3$ to form chemical bonds rather than physical blending.

Example 2

Poly(ethylene-co-acrylic acid) containing R—COOH was dissolved or dispersed in water. Subsequently, inorganic particles $Mg(OH)_2$ with reactive functional groups M-OH were added to the polymer solution, and the mixture was stirred at 70-90° C. for 20 minutes. 1 mm-thick mixture slurry was coated on a teflon sheet, and then placed in an oven, dried at 60° C. for 60 minutes, 80° C. for 60 minutes, 100° C. for 60 minutes, 120° C. for 30 minutes, 140° C. for 30 minutes, 160° C. for 30 minutes, 180° C. for 30 minutes, and finally, molded at 200° C. for 240 minutes.

As shown in FIG. 4, the sample layer 20 was removed from the teflon sheet (not shown), and placed on a piece of A4 size paper 10. A flame test was conducted on the surface of the sample layer 20 by butane gas torch 30 with flame temperature of 1000-1200° C. (flame 40) for 30 seconds to 3 minutes. The result of the burning phenomenon of the piece of A4 size paper is summarized in Table 1. No scorching was observed on the piece of A4 size paper after heating for 30, 60 and 120 seconds while it became slightly scorched after heating for 180 seconds.

According to this embodiment, the duration of fire resistance was more than 3 minutes due to the strengthened sample layer, i.e. R—COOH of poly(ethylene-co-acrylic acid) reacted with M-OH of $Mg(OH)_2$ to form chemical bonds rather than physical blending.

Example 3

Poly(acrylic acid-co-maleic acid) containing R—COOH was dissolved or dispersed in water. Subsequently, inorganic particles $Al(OH)_3$ with reactive functional groups M-OH were added to the polymer solution, and the mixture was stirred at 70-90° C. for 20 minutes. 1 mm-thick mixture slurry was coated on a teflon sheet, and then placed in an oven, dried at 60° C. for 60 minutes, 80° C. for 60 minutes, 100° C. for 60 minutes, 120° C. for 30 minutes, 140° C. for 30 minutes, 160° C. for 30 minutes, 180° C. for 30 minutes, and finally, molded at 200° C. for 240 minutes.

As shown in FIG. 4, the sample layer 20 was removed from the teflon sheet (not shown), and placed on a piece of A4 size paper 10. A flame test was conducted on the surface of the sample layer 20 by butane gas torch 30 with flame temperature of 1000-1200° C. (flame 40) for 30 seconds to 3 minutes. The result of the burning phenomenon of the piece of A4 size paper is summarized in Table 1. No scorching was observed on the piece of A4 size paper after heating for 30, 60 and 120 seconds while it became slightly scorched after heating for 180 seconds.

According to this embodiment, the duration if fire resistant ability was more than 3 minutes due to the strengthened sample layer, i.e. R—COOH of poly(acrylic acid-co-maleic acid) reacted with M-OH of $Al(OH)_3$ to form chemical bonds rather than physical blending.

Example 4

Polyurethane containing R—NCO was dissolved or dispersed in hexane. Subsequently, inorganic particles $Al(OH)_3$ with reactive functional groups M-OH were added to the polymer solution, and the mixture was stirred at room temperature for 20 minutes. 1 mm-thick mixture slurry was coated on a teflon sheet, and then placed in an oven, molded at 60° C. for 120 minutes.

As shown in FIG. 4, the sample layer 20 was removed from the teflon sheet (not shown), and placed on a piece of A4 size paper 10. A flame test was conducted on the surface of the sample layer 20 by butane gas torch 30 with flame temperature of 1000-1200° C. (flame 40) for 30 seconds to 3 minutes. The result of the burning phenomenon of the piece of A4 size paper is summarized in Table 1. No scorching was observed on the piece of A4 size paper after heating for 30, 60 and 120 seconds while it became slightly scorched after heating for 180 seconds.

According to this embodiment, the duration of fire resistance was more than 3 minutes due to the strengthened sample layer, i.e. R—NCO of polyurethane reacted with M-OH of $Al(OH)_3$ to form chemical bonds rather than physical blending.

Comparative Example 1

Poly(ethylene-co-acrylic acid) containing R—COOH was dissolved or dispersed in water. Subsequently, unmodified inorganic particles $SiO_2$ were added to the polymer solution, and the mixture was stirred at 70~90° C. for 20 minutes. 1 mm-thick mixture slurry was coated on a teflon sheet, and then placed in an oven, dried at 60° C. for 60 minutes, 80° C. for 60 minutes, 100° C. for 60 minutes, 120° C. for 30 minutes, 140° C. for 30 minutes, 160° C. for 30 minutes, 180° C. for 30 minutes, and finally, molded at 200° C. for 240 minutes.

As shown in FIG. 4, the sample layer 20 was removed from the teflon sheet (not shown), and placed on a piece of A4 size paper 10. A flame test was conducted on the surface of the sample layer 20 by butane gas torch 30 with flame temperature of 1000-1200° C. (flame 40) for 30 seconds to 3 minutes. The result of the burning phenomenon of the piece of A4 size paper is summarized in Table 1. When the flame contacted the surface of the sample layer, the composite rapidly melted within several seconds and then charred irregularly in 30 seconds. The nonuniform char had lost its structural integrity due to the formation of cracks. A piece of A4 size paper became slightly scorched after heating for 30 seconds; scorched after heating for 60 seconds. Finally, the paper substrate burned after heating for 120 seconds because of the majority of cracks.

According to this comparative example, the duration of fire resistance was less than 2 minutes because R—COOH of poly(ethylene-co-acrylic acid) did not react with unmodified $SiO_2$ to form a well-structured composite by the formation of chemical bonds.

Comparative Example 2

Poly(acrylic acid-co-maleic acid) containing R—COOH was dissolved or dispersed in water. Subsequently, unmodified inorganic particles $Al_2O_3$ were added to the polymer solution, and the mixture was stirred at 70~90° C. for 20 minutes. 1 mm-thick mixture slurry was coated on a teflon sheet, and then placed in an oven, dried at 60° C. for 60 minutes, 80° C. for 60 minutes, 100° C. for 60 minutes, 120° C. for 30 minutes, 140° C. for 30 minutes, 160° C. for 30 minutes, 180° C. for 30 minutes, and finally, molded at 200° C. for 240 minutes.

As shown in FIG. 4, the sample layer 20 was removed from the teflon sheet (not shown), and placed on a piece of A4 size paper 10. A flame test was conducted on the surface of the sample layer 20 by butane gas torch 30 with flame temperature of 1000-1200° C. (flame 40) for 30 seconds to 3 minutes. The result of the burning phenomenon of the piece of A4 size paper is summarized in Table 1. When the flame contacted the surface of the sample layer, the composite rapidly melted within several seconds and then charred irregularly in 30 seconds. The nonuniform char had lost its structural integrity due to the formation of cracks. A piece of A4 size paper became slightly scorched after heating for 30 seconds; scorched after heating for 60 seconds. Finally, the paper substrate burned after heating for 120 seconds because of the majority of cracks.

According to this comparative example, the duration of fire resistance was less than 2 minutes because R—COOH of poly(acrylic acid-co-maleic acid) did not react with unmodified $Al_2O_3$ to form a well-structured composite by the formation of chemical bonds.

Comparative Example 3

Polyurethane containing R—NCO was dissolved or dispersed in hexane. Subsequently, unmodified inorganic particles $SiO_2$ were added to the polymer solution, and the mixture was stirred at room temperature for 20 minutes. 1 mm-thick mixture slurry was coated on a teflon sheet, and then placed in an oven and molded at 60° C. for 120 minutes.

As shown in FIG. 4, the sample layer 20 was removed from the teflon sheet (not shown), and placed on a piece of A4 size paper 10. A flame test was conducted on the surface of the sample layer 20 by butane gas torch 30 with flame temperature of 1000-1200° C. (flame 40) for 30 seconds to 3 minutes. The result of the burning phenomenon of the piece of A4 size paper is summarized in Table 1. When the flame contacted the surface of the sample layer, the composite rapidly melted within several seconds and then charred irregularly in 30 seconds. The nonuniform char had lost its structural integrity due to the formation of cracks. A piece of A4 size paper became slightly scorched after heating for 30 to 60 seconds; scorched after heating for 120 seconds. Finally, the paper substrate burned after heating for 180 seconds because of the majority of cracks.

According to this comparative example, the duration of fire resistance was about 2 minutes because R—NCO of polyurethane did not react with unmodified $SiO_2$ to form a well-structured composite by the formation of chemical bonds.

Comparative Example 4

Poly(vinyl alcohol) containing R—OH was dissolved or dispersed in water. Subsequently, inorganic particles $Al(OH)_3$ were added to the polymer solution, and the mixture was stirred at 70-90° C. for 20 minutes. 1 mm-thick mixture slurry was coated on a teflon sheet, and then placed in an oven, dried at 60° C. for 60 minutes, 80° C. for 60 minutes, 100° C. for 60 minutes, 120° C. for 30 minutes, 140° C. for 30 minutes, 160° C. for 30 minutes, 180° C. for 30 minutes, and finally, molded at 200° C. for 240 minutes.

As shown in FIG. 4, the sample layer 20 was removed from the teflon sheet (not shown), and placed on a piece of A4 size paper 10. A flame test was conducted on the surface of the sample layer 20 by butane gas torch 30 with flame temperature of 1000-1200° C. (flame 40) for 30 seconds to 3 minutes. The result of the burning phenomenon of the piece of A4 size paper is summarized in Table 1. When the flame contacted the surface of the sample layer, the composite rapidly melted within several seconds and then charred irregularly in 30 seconds. The nonuniform char had lost its structural integrity due to the formation of cracks. A piece of A4 size paper became slightly scorched after heating for 30 seconds; scorched after heating for 60 seconds. Finally, the paper substrate burned after heating for 120 seconds because of the majority of cracks.

According to this comparative example, the duration of fire resistance was less than 2 minutes because R—OH of poly (vinyl alcohol) did not react with the M-OH of $Al(OH)_3$ to form a well-structured composite by the formation of chemical bonds.

Due to the chemical bonding between the corresponding reactive functional groups of the organic polymer and the inorganic particles, the formed char layer on the surface is firm with excellent structural integrity and does not easily crack or peel, effectively preventing direct heat transfer to the interior. The fire resistant material is not only flame retardant but also protective of interior materials. As a result, the fire resistance is significantly extended.

TABLE 1

Results of the flame test of the organic/inorganic composite materials

| | Organic polymer | Inorganic particles | Paper states after direct heating at 1000–1200° C. for 30 secs | 1 min | 2 mins | 3 mins |
|---|---|---|---|---|---|---|
| Example 1 | poly(ethylene-co-acrylic acid) | $Al(OH)_3$ | unchanged | unchanged | unchanged | Slightly scorched |
| Example 2 | poly(ethylene-co-acrylic acid) | $Mg(OH)_2$ | unchanged | unchanged | unchanged | Slightly scorched |
| Example 3 | poly(acrylic acid-co-maleic acid) | $Al(OH)_3$ | unchanged | unchanged | unchanged | Slightly scorched |
| Example 4 | polyurethane | $Al(OH)_3$ | unchanged | unchanged | unchanged | Slightly scorched |
| Com. Example 1 | poly(ethylene-co-acrylic acid) | $SiO_2$ | Slightly scorched | Scorched | burning | — |
| Com. Example 2 | poly(acrylic acid-co-maleic acid) | $Al_2O_3$ | Slightly scorched | Scorched | burning | — |
| Com. Example 3 | polyurethane | $SiO_2$ | Slightly scorched | Slightly scorched | Scorched | burning |
| Com. Example 4 | poly vinyl alcohol | $Al(OH)_3$ | Slightly scorched | Scorched | burning | — |

Examples of Fire-Resistant Plates

Example 5

10 g of poly(ethylene-co-acrylic acid) was charged in a reactor, preheated to melt at 80-120° C. and then stirred at 300 rpm. 10.8 g of deionized water and 10.8 g of aqueous ammonia were added to the reactor, giving a white emulsion after stirring for 10 minutes. Subsequently, 10 g of aluminum hydroxide powder was added to the reactor, giving a white slurry after stirring for 10 minutes. The slurry was charged in a 100*100*2 mm teflon mold and then placed in an oven, dried at 60° C. for 60 minutes, 80° C. for 60 minutes, 100° C. for 60 minutes, 120° C. for 30 minutes, 140° C. for 30 minutes, 160° C. for 30 minutes, 180° C. for 30 minutes, and finally, molded at 200° C. for 240 minutes.

A 2 mm-thick molded plate was removed from the teflon mold, and placed on a piece of A4 size paper. A flame test was conducted on the surface of the fire-resistant plate by butane gas torch with flame temperature of 1000-1200° C. for 30 seconds to 3 minutes. The result of the burning phenomenon of the piece of A4 size paper is summarized in Table 2. No scorching was observed on the piece of A4 size paper after heating for 30, 60 and 120 seconds while it became slightly scorched after heating for 180 seconds.

According to this example, the duration of fire resistance was more than 3 minutes due to the strengthened sample layer, i.e. R—COOH of poly(ethylene-co-acrylic acid) reacted with M-OH of $Al(OH)_3$ to form chemical bonds rather than physical blending.

Example 6

10 g of poly(ethylene-co-acrylic acid) was charged in a reactor, preheated to melt at 80-120° C. and then stirred at 300 rpm. Subsequently, 10 g of aluminum hydroxide powder was added to the reactor, giving a white slurry after stirring for 10 minutes. The slurry was charged in a 100*100*2 mm teflon mold and then placed in an oven, dried at 60° C. for 60 minutes, 80° C. for 60 minutes, 100° C. for 60 minutes, 120° C. for 30 minutes, 140° C. for 30 minutes, 160° C. for 30 minutes, 180° C. for 30 minutes, and finally, molded at 200° C. for 240 minutes.

A 2 mm-thick molded plate was removed from the teflon mold, and placed on a piece of A4 size paper. A flame test was conducted on the surface of the fire-resistant plate by butane gas torch with flame temperature of 1000-1200° C. for 30 seconds to 3 minutes. The result of the burning phenomenon of the piece of A4 size paper is summarized in Table 2. No scorching was observed on the piece of A4 size paper after heating for 30, 60 and 120 seconds while it became slightly scorched after heating for 180 seconds.

According to this example, the duration of fire resistance was more than 3 minutes due to the strengthened sample layer, i.e. —COOH of poly(ethylene-co-acrylic acid) reacted with —OH of $Al(OH)_3$ to form chemical bonds rather than physical blending.

Example 7

20 g of poly(acrylic acid-co-maleic acid) (50 wt % solid content) was charged in a reactor, preheated at 80-90° C. and then stirred at 300 rpm. 10 g of aqueous ammonia were added to the reactor and stirred for 10 minutes. Subsequently, 10 g of aluminum hydroxide powder was added to the reactor, giving a yellow slurry after stirring for 10 minutes. The slurry was charged in a 100*100*2 mm teflon mold and then placed in an oven, dried at 60° C. for 60 minutes, 80° C. for 60 minutes, 100° C. for 60 minutes, 120° C. for 30 minutes, 140° C. for 30 minutes, 160° C. for 30 minutes, 180° C. for 30 minutes, and finally, molded at 200° C. for 240 minutes.

A 2 mm-thick molded plate was removed from the teflon mold, and placed on a piece of A4 size paper. A flame test was conducted on the surface of the fire-resistant plate by butane gas torch with flame temperature of 1000-1200° C. for 30 seconds to 3 minutes. The result of the burning phenomenon of the piece of A4 size paper is summarized in Table 2. No scorching was observed on the piece of A4 size paper after heating for 30, 60 and 120 seconds while it became slightly scorched after heating for 180 seconds.

According to this example, the duration of fire resistance was more than 3 minutes due to the strengthened sample layer, i.e. —COOH of poly(acrylic acid-co-maleic acid) reacted with —OH of $Al(OH)_3$ to form chemical bonds rather than physical blending.

Example 8

50 g of reactive polyurethane containing 8% reactive isocyanate groups was charged in a reactor and stirred at 300 rpm. Subsequently, 50 g of aluminum hydroxide powder was added to the reactor, giving a white slurry after stirring for 5 minutes. The slurry was charged in a 100*100*2 mm teflon mold and then dried at room temperature for 24 hours.

A 2 mm-thick molded plate was removed from the teflon mold, and placed on a piece of A4 size paper. A flame test was conducted on the surface of the fire-resistant plate by butane gas torch with flame temperature of 1000-1200° C. for 30 seconds to 3 minutes. The result of the burning phenomenon of the piece of A4 size paper is summarized in Table 2. No scorching was observed on the piece of A4 size paper after heating for 30, 60 and 120 seconds while it became slightly scorched after heating for 180 seconds.

According to this example, the duration of fire resistance was more than 3 minutes due to the strengthened sample layer, i.e. —NCO of reactive polyurethane reacted with —OH of $Al(OH)_3$ to form chemical bonds rather than physical blending.

Example 9

50 g of reactive polyurethane containing 8% reactive isocyanate groups was charged in a reactor and stirred at 300 rpm. Subsequently, 45 g of magnesium hydroxide powder and 5 g of modified nanoclay containing —OH groups (Cloisite 30B from Southern Clay Product Corp.) were added to the reactor, giving a white slurry after stirring for 5 minutes. The slurry was charged in a 100*100*2 mm teflon mold and then dried at room temperature for 24 hours.

A 2 mm-thick molded plate was removed from the teflon mold, and placed on a piece of A4 size paper. A flame test was conducted on the surface of the fire-resistant plate by butane gas torch with flame temperature of 1000-1200° C. for 30 seconds to 3 minutes. The result of the burning phenomenon of the piece of A4 size paper is summarized in Table 2. No scorching was observed on the piece of A4 size paper after heating for 30, 60 and 120 seconds while it became slightly scorched after heating for 180 seconds.

According to this example, the duration of fire resistance was more than 3 minutes due to the strengthened sample layer, i.e. —NCO of reactive polyurethane reacted with —OH of $Mg(OH)_3$ and nanoclay to form chemical bonds rather than physical blending.

Example 10

Figure 5:
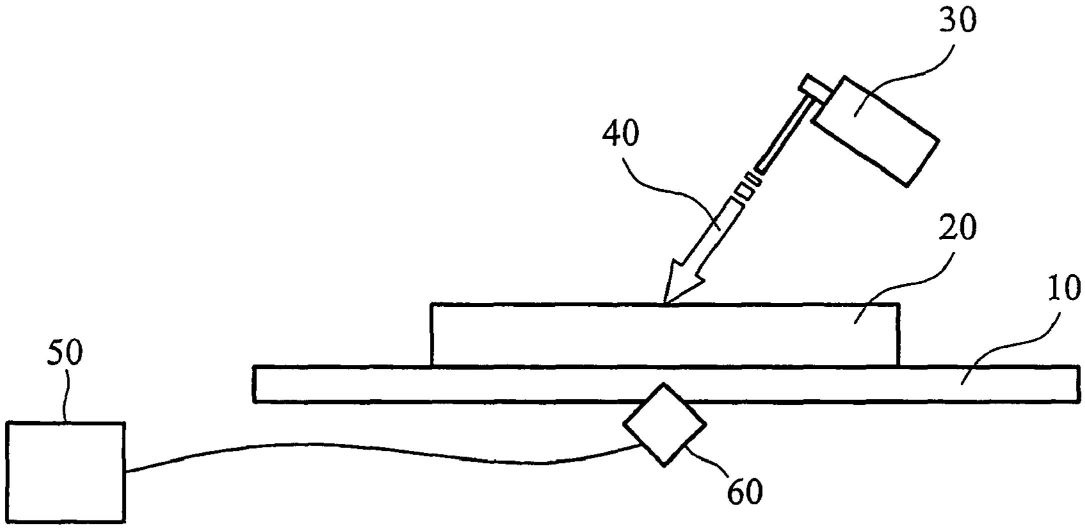
FIG. 5 is a schematic figure demonstrating the temperature measurement of the A4 size paper in Example 10.
Figure 6:
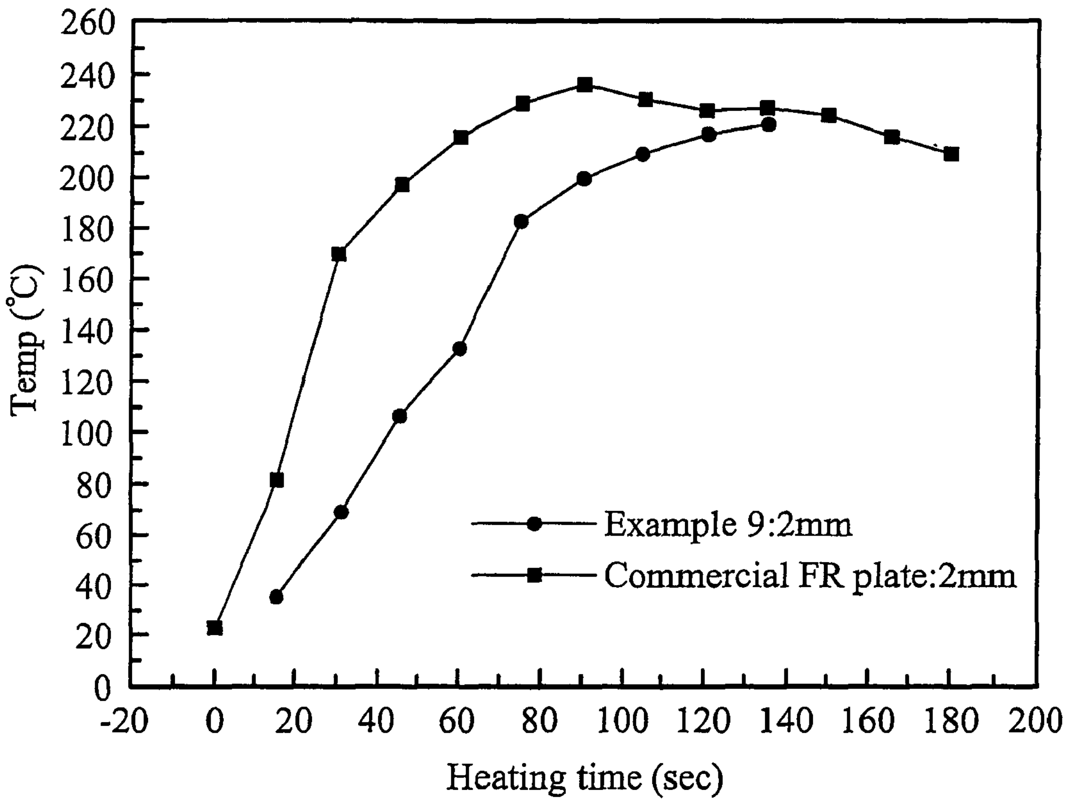
FIG. 6 is a diagram showing the backside temperature of the A4 size paper as a function of heating time, in which the fire-resistant plate of Example 9 and a commercial fire-resistant coating material are compared.

Referring to FIG. 5, the fire-resistant plate 20 of Example 9 was placed on a piece of A4 size paper 10, and a flame test was conducted on the surface of the fire-resistant plate by butane gas torch 30 with flame temperature of 1000-1200° C. (flame 40) for 180 seconds, where the bottom surface of the A4 size paper 10 was connected to thermocouple 60 of a temperature detector 50 to monitor the temperature rise. A commercial intumescent fire-resistant plate (FM-900 from YUNG CHI PAINT & VARNISH MFG. CO., LTD) of 2 mm thickness was subjected to the same flame test. As shown in FIG. 6, the temperature under the commercial intumescent fire-resistant plate increased rapidly to 200° C. after heating for 60 seconds. In comparison, the temperature under the fire-resistant plate of Example 5 slowly increased to 200° C. till heating for 100 seconds.

According to this example, the duration of fire resistance was remarkably improved due to the strengthened sample layer, i.e. —NCO of reactive polyurethane reacted with —OH of $Mg(OH)_3$ and nanoclay to form chemical bonds rather than physical blending.

Example 11

50 g of reactive polyurethane containing 7.6% reactive isocyanate groups was charged in a reactor and stirred at 300 rpm. Subsequently, 50 g of modified titanium dioxide powder which carried —OH functional groups on the surface was added to the reactor, giving a white slurry after stirring for 5 minutes. The slurry was charged in a 100*100*2 mm teflon mold, dried at room temperature for 24 hours, and finally molded in an oven at 80° C. for 24 hours.

A 2 mm-thick molded plate was removed from the teflon mold, and placed on a piece of A4 size paper. A flame test was conducted on the surface of the fire-resistant plate by butane gas torch with flame temperature of 1000-1200° C. for 30 seconds to 3 minutes. The result of the burning phenomenon of the piece of A4 size paper is summarized in Table 2. No scorching was observed on the piece of A4 size paper after heating for 30, 60 and 120 seconds while it became slightly scorched after heating for 180 seconds.

According to this example, the duration of fire resistance was more than 3 minutes due to the strengthened sample layer, i.e. —NCO of reactive polyurethane reacted with —OH of modified $TiO_2$ to form chemical bonds rather than physical blending.

Example 12

40 g of reactive polyurethane containing 7.6% reactive isocyanate groups was charged in a reactor and stirred at 300 rpm. 50 g of modified titanium dioxide powder which carried —OH functional groups on the surface was added to the reactor and stirred for 3 minutes. Subsequently, 10 g of PPG 400 (polypropylene glycol; Mw=400) was added to the reactor, giving a white slurry after stirring for 2 minutes. The slurry was charged in a 100*100*2 mm teflon mold, dried at room temperature for 24 hours, and finally molded in an oven at 80° C. for 24 hours.

A 2 mm-thick molded plate was removed from the teflon mold and placed on a piece of A4 size paper. The plate had excellent flexibility, exhibiting a radius of curvature of about 3 cm. A flame test was conducted on the surface of the fire-resistant plate by butane gas torch with flame temperature of 1000-1200° C. for 30 seconds to 3 minutes. The result of the burning phenomenon of the piece of A4 size paper is summarized in Table 2. No scorching was observed on the piece of A4 size paper after heating for 30, 60 and 120 seconds while it became slightly scorched after heating for 180 seconds.

According to this example, the duration of fire resistance was more than 3 minutes due to the strengthened sample layer, i.e. —NCO of reactive polyurethane reacted with —OH of modified $TiO_2$ to form chemical bonds rather than physical blending.

Example 13

40 g of reactive polyurethane containing 8% reactive isocyanate groups was charged in a reactor and stirred at 300 rpm. Subsequently, 45 g of modified titanium dioxide powder which carried —OH functional groups on the surface and 5 g of modified nanoclay containing —OH groups (Cloisite 30B from Southern Clay Product Corp.) were added to the reactor and stirred for 3 minutes. Next, 10 g of PPG 400 (polypropylene glycol; Mw=400) was added to the reactor, giving a light yellow slurry after stirring for 2 minutes. The slurry was charged in a 100*100*2 mm teflon mold, dried at room temperature for 24 hours, and finally molded in an oven at 80° C. for 24 hours.

A 2 mm-thick molded plate was removed from the teflon mold and placed on a piece of A4 size paper. The plate had excellent flexibility, exhibiting a radius of curvature of about 3 cm. A flame test was conducted on the surface of the fire-resistant plate by butane gas torch with flame temperature of 1000-1200° C. for 30 seconds to 3 minutes. The result of the burning phenomenon of the piece of A4 size paper is summarized in Table 2. No scorching was observed on the piece of A4 size paper after heating for 30, 60 and 120 seconds while it became slightly scorched after heating for 180 seconds.

According to this example, the duration of fire resistance was more than 3 minutes due to the strengthened sample layer, i.e. —NCO of reactive polyurethane reacted with —OH of nanoclay and modified $TiO_2$ to form chemical bonds rather than physical blending.

Example 14

20 g of 3,4-epoxycyclohexyl methyl-3,4-epoxycyclohexane carboxylate (E4221, epoxy resin from Union Carbide) was charged in a reactor and stirred at 300 rpm, followed by addition of an excess amount (8 g, equivalence ratio of E4221/MeHHPA=1/1.14) of MeHHPA (hexahydro-4-methylphthalic anhydride) as curing agent and 0.1 g of BDMA (N,N-dimethyl benzylamine) as catalyst. After stirring for 5 minutes, 48.1 g of aluminum hydroxide powder was added to the reactor, giving a white slurry after stirring for 10 minutes. The slurry was charged in 100*100*2 mm and 100*100*4 mm teflon mold, dried at 120° C. for 1 hours.

2 mm and 4 mm-thick molded plates were removed from the teflon molds and placed on a piece of A4 size paper. A flame test was conducted on the surface of the fire-resistant plates by butane gas torch with flame temperature of 1000-1200° C. for 30 seconds to 3 minutes. The result of the burning phenomenon of the piece of A4 size paper is summarized in Table 2. For 2 mm-thick molded plate, no scorching was observed on the piece of A4 size paper after heating for 30 and 60 while it became slightly scorched after heating for 120 seconds, and scorched after heating for 180 seconds. For 4 mm-thick molded plate, no scorching was observed on the piece of A4 size paper after heating for 30, 60 and 120 seconds while it became slightly scorched after heating for 180 seconds.

According to this example, the duration of fire resistance was more than 3 minutes due to the strengthened sample layer, i.e. anhydride groups of epoxy resin (derived from excess MeHHPA) reacted with —OH groups of $Al(OH)_3$ to form chemical bonds rather than physical blending.

Comparative Example 5

50 g of reactive polyurethane containing 8% reactive isocyanate groups was charged in a reactor and stirred at 300 rpm. Subsequently, 50 g of unmodified silicon dioxide powder was added to the reactor, giving a white slurry after stirring for 5 minutes. The slurry was charged in a 100*100*2 mm teflon mold, then dried at room temperature for 24 hours, and finally molded in an oven at 80° C. for 24 hours.

A 2 mm-thick molded plate was removed from the teflon mold, and placed on a piece of A4 size paper. A flame test was conducted on the surface of the fire-resistant plate by butane gas torch with flame temperature of 1000-1200° C. for 30 seconds to 3 minutes. The result of the burning phenomenon of the piece of A4 size paper is summarized in Table 2. When the flame contacted the surface of the sample layer, the composite rapidly melted within several seconds and then charred irregularly in 30 seconds. The nonuniform char had lost its structural integrity due to the formation of cracks. A piece of A4 size paper became slightly scorched after heating for 30 seconds; scorched after heating for 60 seconds. Finally, the paper burned after heating for 120 seconds because of the majority of cracks.

According to this comparative example, the plate could not withstand a flame temperature of 1000-1200° C. because the unmodified $SiO_2$ surfaces failed to react with —NCO of polyurethane to form a well-structured composite by the formation of chemical bonds.

Comparative Example 6

50 g of polyurethane containing no reactive isocyanate group was charged in a reactor and stirred at 300 rpm. Subsequently, 50 g of aluminum hydroxide powder was added to the reactor, giving a white slurry after stirring for 5 minutes. The slurry was charged in a 100*100*2 mm teflon mold, then dried in an oven at 60° C. for 120 minutes, 80° C. for 120 minutes, 100° C. for 120 minutes, and finally molded at 120° C. for 360 minutes.

A 2 mm-thick molded plate was removed from the teflon mold, and placed on a piece of A4 size paper. A flame test was conducted on the surface of the fire-resistant plate by butane gas torch with flame temperature of 1000-1200° C. for 30 seconds to 3 minutes. The result of the burning phenomenon of the piece of A4 size paper is summarized in Table 2. When the flame contacted the surface of the sample layer, the composite rapidly melted within several seconds and then charred irregularly in 30 seconds. The nonuniform char had lost its structural integrity due to the formation of cracks. A piece of A4 size paper became scorched after heating for 30 seconds. Finally, the paper burned after heating for 60 seconds because of the majority of cracks.

According to this comparative example, the plate could not withstand a flame temperature of 1000-1200° C. because the polyurethane had no reactive functional group to react with —OH of aluminum hydroxide to form a well-structured composite by the formation of chemical bonds.

Comparative Example 7

50 g of poly(vinyl alcohol) containing —OH groups was dissolved in water and then stirred at 300 rpm. Subsequently, 50 g of aluminum hydroxide powder was added to poly(vinyl alcohol), giving a white slurry after stirring at 70-90° C. for 20 minutes. The slurry was charged in a 100*100*2 mm teflon mold and then placed in an oven, dried at 60° C. for 60 minutes, 80° C. for 60 minutes, 100° C. for 60 minutes, 120° C. for 30 minutes, 140° C. for 30 minutes, 160° C. for 30 minutes, 180° C. for 30 minutes, and finally, molded at 200° C. for 240 minutes.

A 2 mm-thick molded plate was removed from the teflon mold, and placed on a piece of A4 size paper. A flame test was conducted on the surface of the fire-resistant plate by butane gas torch with flame temperature of 1000-1200° C. for 30 seconds to 3 minutes. The result of the burning phenomenon of the piece of A4 size paper is summarized in Table 2. When the flame contacted the surface of the sample layer, the composite rapidly melted within several seconds and then charred irregularly in 30 seconds. The nonuniform char had lost its structural integrity due to the formation of cracks. A piece of A4 size paper became slightly scorched after heating for 30 seconds; scorched after heating for 60 seconds. Finally, the paper burned after heating for 120 seconds because of the majority of cracks.

According to this comparative example, the plate could not withstand a flame temperature of 1000-1200° C. because —OH groups of aluminum hydroxide could not react with —OH groups of poly(vinyl alcohol) to form a well-structured composite by the formation of chemical bonds.

TABLE 2

Results of the flame test of the fire-resistant plates

| | Organic polymer | | Inorganic particles | Paper states after direct heating at 1000–1200° C. for 30 secs | 1 min | 2 mins | 3 mins |
|---|---|---|---|---|---|---|---|
| Example 5 | poly(ethylene-co-acrylic acid) | | $Al(OH)_3$ | unchanged | unchanged | unchanged | Slightly scorched |
| Example 6 | poly(ethylene-co-acrylic acid) | | $Al(OH)_3$ | unchanged | unchanged | unchanged | Slightly scorched |
| Example 7 | poly(acrylic acid-co-maleic acid) | | $Al(OH)_3$ | unchanged | unchanged | unchanged | Slightly scorched |
| Example 8 | reactive polyurethane (poly isocyanate) | | $Al(OH)_3$ | unchanged | unchanged | unchanged | Slightly Scorched |
| Example 9 | reactive polyurethane (poly isocyanate) | | $Mg(OH)_2$ Clay(OH) | unchanged | unchanged | unchanged | Slightly scorched |
| Example 11 | reactive polyurethane (poly isocyanate) | | $TiO_2$ | unchanged | unchanged | unchanged | Slightly scorched |
| Example 12 | reactive polyurethane (poly isocyanate) | PPG400 | $TiO_2$ | unchanged | unchanged | unchanged | Slightly scorched |
| Example 13 | reactive polyurethane (poly isocyanate) | PPG400 | $TiO_2$ Clay(OH) | unchanged | unchanged | unchanged | Slightly scorched |
| Example 14 (2 mm) | E4221/MeHHPA (epoxy/anhydride) | | $Al(OH)_3$ | unchanged | unchanged | unchanged | Slightly scorched |
| Example 14 (4 mm) | E4221/MeHHPA (epoxy/anhydride) | | $Al(OH)_3$ | unchanged | unchanged | Slightly scorched | scorched |
| Com. Example 5 | reactive polyurethane (poly isocyanate) | | $SiO_2$ | Slightly scorched | scorched | burned | — |
| Com. Example 6 | Polyurethane | | $Al(OH)_3$ | scorched | burned | — | — |
| Com. Example 7 | poly(vinyl alcohol) | | $Al(OH)_3$ | Slightly scorched | scorched | burned | — |

While the invention has been described by ways of examples and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An organic/inorganic composite comprising:

30-70% by weight of an organic component comprising a polymer, copolymer, or oligomer having a first reactive functional group of isocyanate; and 70-30% by weight of flame retardant inorganic particles having a second reactive functional group of hydroxyl;

wherein the flame retardant inorganic particles are chemically bonded to the polymer, copolymer, or oligomer via a reaction between the first and second reactive functional groups;

wherein the flame retardant inorganic particles are metal hydroxide; and wherein the flame retardant inorganic particles and the organic component are sufficiently bonded to a degree to provide a fire resistance capable of withstanding flame temperatures between 1000 and 1200° C. for more than 3 minutes.

2. The organic/inorganic composite as claimed in claim 1, wherein the organic component comprises polyurethane, or polyolefin copolymer having isocyanate groups.

3. The organic/inorganic composite as claimed in claim 1, wherein the metal hydroxide comprises $Al(OH)_3$ or $Mg(OH)_2$.

4. A fire-resistant plate, comprising:

an organic/inorganic composite comprising:

30-70% by weight of an organic component comprising a polymer, copolymer, or oligomer having a first reactive functional group of isocyanate; and 70-30% by weight of flame retardant inorganic particles having a second reactive functional group of hydroxyl;

wherein the inorganic particles are chemically bonded to the polymer, copolymer, or oligomer via a reaction between the first and second reactive functional groups; and wherein the flame retardant inorganic particles are metal hydroxide; and wherein the flame retardant inorganic particles and the organic component are sufficiently bonded to a degree to provide a fire resistance capable of withstanding flame temperatures between 1000 and 1200° C. for more than 3 minutes.

5. The fire-resistant plate as claimed in claim 4, wherein the organic component comprises polyurethane, or polyolefin copolymer having isocyanate groups.

6. The fire-resistant plate as claimed in claim 4, wherein the metal hydroxide comprises $Al(OH)_3$ or $Mg(OH)_2$.

7. The fire-resistant plate as claimed in claim 4, further comprising an additive.

8. The fire-resistant plate as claimed in claim 7, wherein the additive comprises flame retardant, silane, siloxane, glass sand, or glass fiber.

9. The fire-resistant plate as claimed in claim 4, having a thickness of less than 0.5 mm.

10. The fire-resistant plate as claimed in claim 4, having a thickness between 0.5 mm and 2 mm.

11. The fire-resistant plate as claimed in claim 4, having a thickness exceeding 2 mm.

12. The fire-resistant plate as claimed in claim 4, further comprising a flammable or inflammable plate stacked on the organic/inorganic composite to form a multilayer structure.

13. The fire-resistant plate as claimed in claim 4, used as a spacer fire-resistant plate.

14. The fire-resistant plate as claimed in claim 4, used as a fire-resistant wallpaper.

15. The fire-resistant plate as claimed in claim 4, being a flexible fire-resistant plate.

16. A method for making an organic/inorganic composite, comprising:

directly mixing (a) 30-70% by weight of an organic component comprising a polymer, copolymer, or oligomer having a first reactive functional group of isocyanate and (b) 70-30% by weight of flame retardant inorganic particles having a second reactive functional group of hydroxyl for reaction, such that the flame retardant inorganic particles are chemically bonded to the polymer, copolymer, or oligomer via a reaction between the first and second reactive functional groups;

wherein the flame retardant inorganic particles are metal hydroxide; and wherein the flame retardant inorganic particles and the organic component are sufficiently bonded to a degree to provide a fire resistance capable of withstanding flame temperatures between 1000 and 1200° C. for more than 3 minutes.

17. The method as claimed in claim 16, wherein the organic component comprises polyurethane, or polyolefin copolymer having isocyanate groups.

18. The method as claimed in claim 16, wherein the metal hydroxide comprises $Al(OH)_3$ or $Mg(OH)_2$.

19. The method as claimed in claim 16, wherein the an organic/inorganic composite is a plate.

* * * * *